(No Model.)
L. E. HUNT.
THERMOMETER.
No. 596,162.  Patented Dec. 28, 1897.
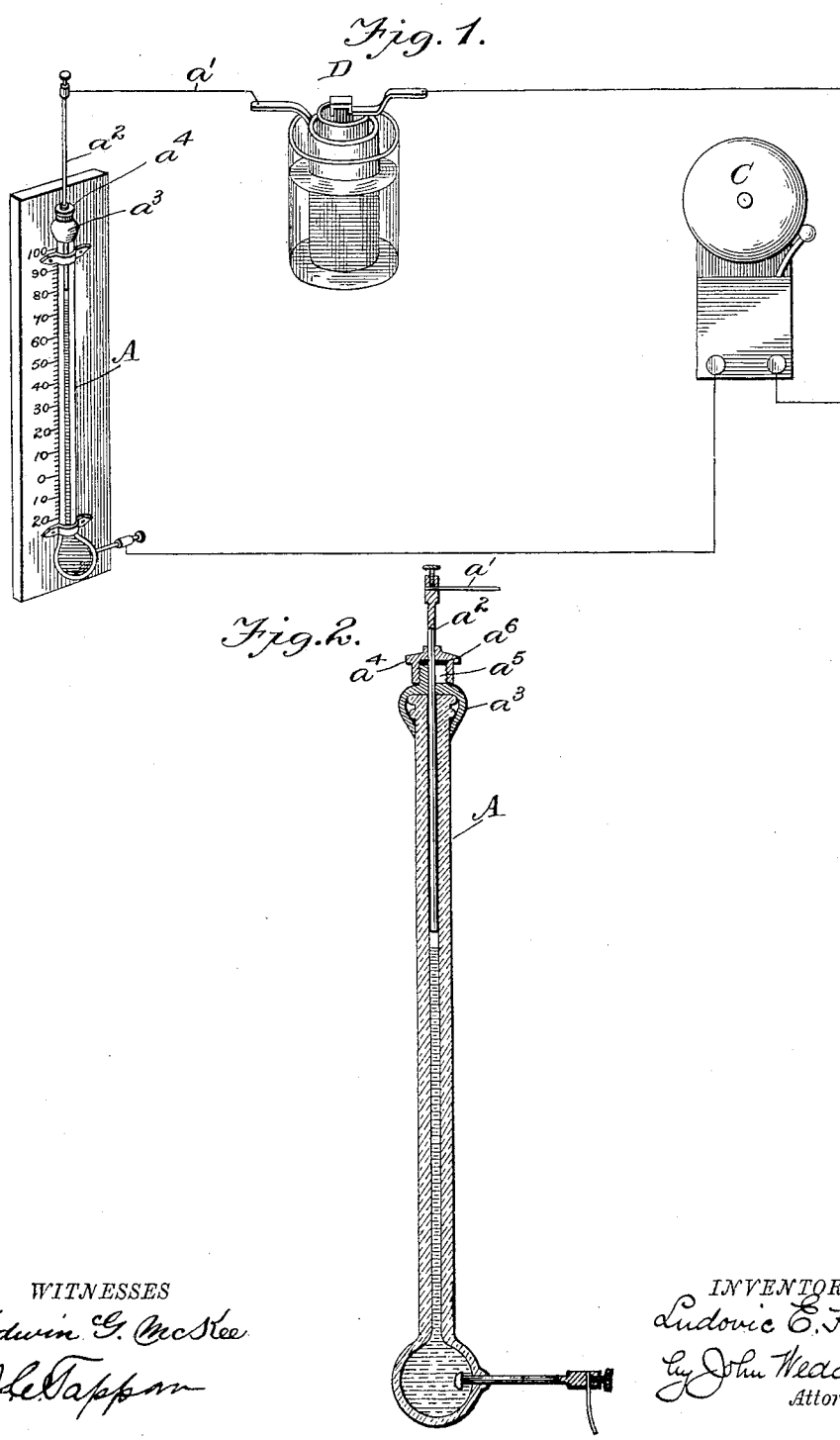
WITNESSES
Edwin G. McKee
J. L. Tappan
INVENTOR,
Ludovic E. Hunt,
By John Wedderburn
Attorney

UNITED STATES PATENT OFFICE.

LUDOVIC E. HUNT, OF SOMERSET, KENTUCKY.

THERMOMETER.

SPECIFICATION forming part of Letters Patent No. 596,162, dated December 28, 1897.

Application filed September 21, 1896. Serial No. 606,531. (No model.)

*To all whom it may concern:*

Be it known that I, LUDOVIC E. HUNT, a citizen of the United States, residing at Somerset, in the county of Pulaski and State of Kentucky, have invented certain new and useful Improvements in Thermometers; and I do hereby declare the following to be a full, clear, and exact description of the invention, such as will enable others skilled in the art to which it appertains to make and use the same.

This invention relates to improvements in thermometers, and has more particular relation to thermometers for indicating when the temperature has descended or risen below or above a predetermined degree.

The invention consists of certain other novel constructions, combinations, and arrangements of parts, all of which will be hereinafter more fully described and claimed.

In the accompanying drawings, forming a part of this specification, Figure 1 represents a perspective view of the devices embodying my invention. Fig. 2 represents a central vertical section through my improved thermometer.

A in the drawings represents the thermometer, D the battery, and C the electrical alarm or bell.

The thermometer A is of the ordinary construction, with the exception that one wire $a$ of an electric circuit extends into the mercury at the bottom of the same, and another wire $a'$ connects with an adjustable rod $a^2$, that projects downward within the hollow tube of the thermometer and is adapted to form an electrical contact with the mercury or fluid within said tube. This rod $a^2$ is adjustable vertically within the upper open end of the thermometer-tube by means of a screw-sleeve $a^3$ and a nut $a^4$. The said sleeve $a^3$ is adapted to be clamped about the upper end of the thermometer-tube and is provided with a split apertured stud $a^5$, through which the rod $a^2$ passes. The nut $a^4$ is screwed upon said stud $a^5$ and turned home into position to tighten the split portions of said stud about the rod $a^2$ to clamp the latter firmly in position. Any suitable packing $a^6$ may be provided between the top of the stud $a^5$ and the bottom of the nut $a^4$ to form an air-tight joint at this point and prevent air from entering the thermometer-tube.

It will be observed from the foregoing description that as the mercury or fluid within the tube rises it will contact with the lower end of the rod $a^2$ and thus complete the electric circuit and sound the alarm. It will also be observed that this sounding of the alarm may be regulated to take place at any desired temperature by simply raising or lowering said rod by its adjusting nut or screw. I contemplate using my improved thermometer on both open and closed circuits, used either singly or jointly.

When a closed circuit is employed, the alarm or bell will be sounded when the mercury or fluid descends below a certain point and thus breaks the electric connection with the lower end of the rod $a^2$.

The particular uses to which my device is applicable are for indicating the temperature of ovens, journaled bearings, retorts, steam-boilers, &c., although it may be employed in any capacity in which an alarm is to be sounded when a certain degree of temperature has been passed, either ascending or descending.

By the peculiarly simple construction of my thermometer-tube with its contacting pieces it may be very cheaply constructed and will not readily become disarranged or inoperative, as the contact-points are fully protected from the atmosphere and will not corrode or be otherwise affected to the detriment of the electrical contact.

When my invention is applied to an oven or journal, a suitable protecting-casing of any desired material is applied about the same to prevent its becoming broken or injured.

Having thus described my invention, what I claim as new, and desire to secure by Letters Patent, is—

1. The combination with a thermometer, of an electrical connector extending into the mercury at the bottom of the same, a cap adapted to fit over and close the upper end of said thermometer and having a screw-threaded split contracting stud, a screw-threaded nut or cap mounted on the split stud and provided with a central aperture, a packing interposed between the top of the stud and under side of the nut or cap, and a contacting rod passing through the split stud and the nut or cap so as to enter the thermometer; the construction being such that the nut or cap jams the split stud and packing against the contacting rod and thus holds it in its adjusted position, substantially as described.

2. The combination with a thermometer-tube having an enlarged upper end, of an electrical connector extending into the mercury at the bottom of the same, a cap mounted upon the upper end of said tube and contracted about the enlarged head, a split screw-threaded stud mounted on said cap, a screw-threaded cap or nut applied on said split stud for contracting the same, and a contacting rod passing through the two caps and screw-threaded stud so as to enter the thermometer-tube; the construction being such that said rod may be clamped in any of its adjusted positions by the split stud, substantially as described.

In testimony whereof I have signed this specification in the presence of two subscribing witnesses.

LUDOVIC E. HUNT.

Witnesses:
E. PARSONS,
GEO. W. WAIT.